Sept. 14, 1948. W. W. FROST 2,449,112
OBJECT HOLDER FOR OPAQUE PICTURE PROJECTORS
Filed Dec. 2, 1947
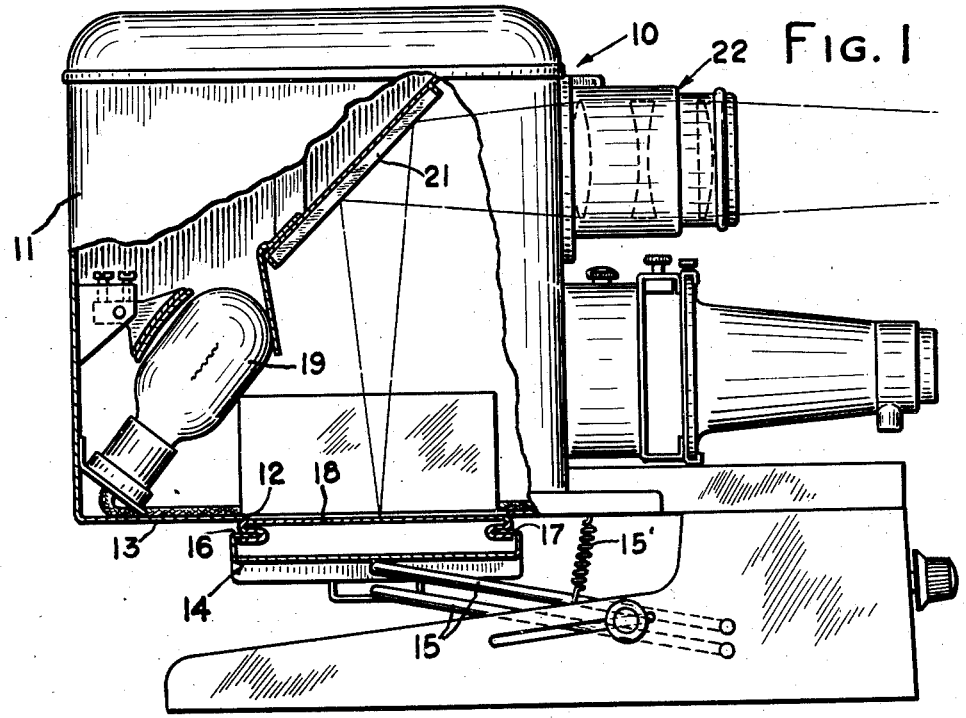
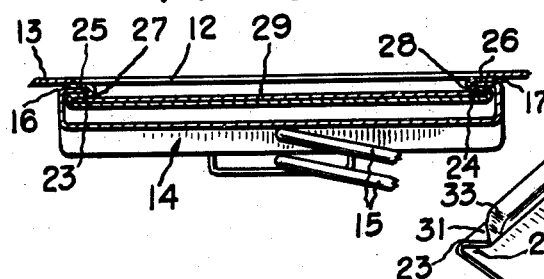
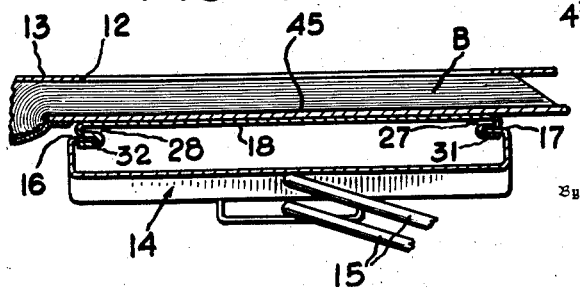
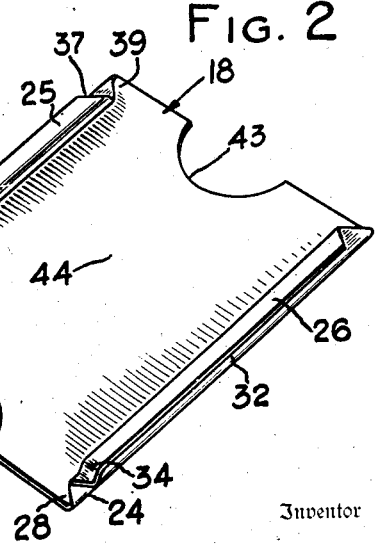
Inventor
W. W. FROST
Attorney Patented Sept. 14, 1948

2,449,112

UNITED STATES PATENT OFFICE 2,449,112

OBJECT HOLDER FOR OPAQUE PICTURE PROJECTORS

Wright W. Frost, Knoxville, Tenn., assignor to Bausch & Lomb Optical Company, Rochester, N. Y., a corporation of New York Application December 2, 1947, Serial No. 789,285

4 Claims. (Cl. 88—26)

This invention relates to projectors for projecting images of pictures and more particularly it has reference to a device for holding a picture or the like in position to be projected by an opaque projector.

In the prior art devices, such as the opaque projector disclosed in U. S. Patent No. 2,200,637 issued to W. T. Perkins et al. on May 14, 1940, the objects to be projected are held in operative position against the projection opening by means of a pivotally mounted, spring pressed holder. Since a page of a book may sometimes be projected, it is essential, in order to hold a heavy book, that the holder be urged against the projection opening by a relatively strong spring tension. It is, of course, necessary to move the object holder against the spring tension each time it is desired to insert or remove a picture for projection. Such movement of the object holder is time-consuming and tiresome, even when the projector embodies cam or lever arrangements to facilitate the operation.

One of the objects of this invention is to provide for an opaque projector a picture holder which will be simple in structure and efficient in operation so as to overcome the foregoing disadvantages. Another object is to provide a picture holder for an opaque projector which will permit the operator to quickly change pictures at the projection opening.

Other objects and advantages will be apparent to those skilled in this art by reference to the following description and accompanying drawing in which:

Fig. 1 is a side elevation, partly in section, of a projector showing the use of a preferred form of this invention, Fig. 2 is a perspective view of the picture holder embodying the invention, Fig. 3 is a sectional view of the picture holder in one of its operative positions, and Fig. 4 is a view similar to Fig. 3 showing the picture holder in another operative position.

In Fig. 1 of the drawing is shown a projector generally indicated at 10 comprising a casing 11 having an opening 12 in its bottom wall 13. An object holder 14 is held over the opening 12 against the wall 13 by means of the parallel support rods 15 which pivotally connect the holder to the frame of the projector. A relatively strong spring 15' normally urges the object holder against the wall 13 so that the object holder may be moved against the tension of the spring to permit the removal or insertion of objects to be projected.

Upstanding inturned flanges 16 and 17 located along opposite sides of the object holder 14 serve as tracks on which an object plate 18 is slidably mounted for holding the objects to be projected. A lamp 19 adjacent the opening 12 illuminates an object placed on the object plate 18, some of the diffused, reflected light rays from the object being directed by an inclined mirror 21 through a projection lens 22 onto a screen in the usual manner.

According to the invention, the object plate 18 or picture holder is preferably formed of a single sheet of metal or other suitable sheet material having double reversed folds 23, 24, 25, 26 along two opposite edge portions thereof which serve the triple purpose of holding an object to be projected, attaching the plate 18 to the holder 14, and providing proper stiffness in the plate. Inwardly facing slideways 27 and 28 formed entirely across the plate 18 are provided by the first pair of folds 23 and 24. The slideways 27 and 28 have ample clearance space for slidably receiving flat opaque objects 29, such as cards, pictures, etc., by two of their opposite parallel edges. Both of the slideways 27 and 28 are open at both ends so that the objects 29 may be passed in at one end and out at the other. The plate 18 is slidably attached to the holder 14 by the outwardly facing pair of slideways 31 and 32 formed by the second pair of folds 25 and 26 which are reversely bent into superimposed position over the first folds 23 and 24. These slideways engage the inturned flanges 16 and 17 of holder 14.

To keep the plate 18 properly located in operating position on holder 14 while pushing the flat objects 29 through the slideways 27 and 28, abutments 33 and 34 are formed in two corresponding terminal portions of the outer folds 25 and 26 by flattening these folds at small areas. The abutments 33 and 34 serve as limiting stops which properly locate the plate 18 when it is slid onto the flanges 16 and 17. Both ends of the folds 23, 24, 25, and 26 are cut away, as shown at 37 and 39, at a steep angle toward the middle of the plate so as to form entrance throats which facilitate the insertion of the flat objects 29 and the attachment of the plate 18 to the holder 14. Re-entrant portions 42 and 43 are provided at either end of the plate 18 for aiding the operator in grasping the ends of the pictures 29 held in the slideways 27 and 28.

In using this invention for the projection of cards, pictures, and the like, the plate 18 is positioned as shown in Fig. 3. The object plate 18 is assembled on the inturned flanges 16 and 17 by engaging them with the slideways 31 and 32 so that the surface 44 lies adjacent the opening 12. The flat objects 29 are then individually inserted in the slideways 27 and 28 at the ends nearest the abutments 33 and 34 and are slid into projecting position in registry with opening 12. Succeeding objects 29 entered in the slideways 27 and 28 serve to push the preceding objects out at the other end without requiring movement of the object holder 14 in any way. When it is desired to project objects which are too large to be slid into the slideways 27 and 28, the plate 18 is removed, turned over and slid onto the flanges 16 and 17 as shown in Fig. 4. This position of the plate 18 provides a continuous flat surface 45 which, by the tension of spring 15', holds an object such as book B against the opening 12 so that an image of the selected page of the book may be projected.

It will be seen from the preceding description that the principal advantage of this invention lies in the fact that flat objects may be passed readily into and out of the focal plane of the projecting lens without operating a lowering mechanism for the holder so that speed and facility of operation are afforded. Although but one form of the invention has been shown and described in detail, it will be understood that other forms are possible and that changes may be made in the proportion and arrangement of the parts and substitutions may be made without departing from the spirit of the invention as defined in the appended claims.

I claim:

1. In a projector having a casing provided with an opening and a holder having oppositely disposed inturned edges for holding an object in projecting position adjacent the opening, the combination of a plate, each of two opposite edge portions of said plate being formed with double reversed folds, one pair of similar folds being faced outwardly and adapted to slidably engage the inturned edges of said holder, the other pair of similar folds being adjacent to the plate and facing inwardly and forming slideways for slidably receiving objects which are to be projected.

2. In a projector having a casing provided with an opening and a holder pivotally mounted on the casing and comprising a plate having upstanding portions with oppositely disposed inturned edges for holding an object in projecting position adjacent the opening, the combination of a picture carrier comprising a plate, two opposite edge portions of the plate being each provided with duplicate reversed folds forming a pair of outwardly facing slideways for slidably engaging said inturned edges of the holder and additionally forming a pair of inwardly facing slideways for slidably receiving objects which are to be projected.

3. In a projector having a casing provided with an opening and a holder pivotally mounted on the casing and comprising a plate having upstanding portions with oppositely disposed inturned edges for holding an object in projecting position adjacent the opening, the combination of an object plate for holding pictures and the like constructed from a single sheet of material whereon superimposed double reversed folds are formed along two opposite edge portions, one pair of similar folds being adapted to slidably engage the inturned edges of said holder, the second pair of similar folds forming slideways for slidably receiving objects which are to be projected, and an integral abutment formed in a corresponding terminal portion of each of the first named pair of folds so as to locate said plate in operative position with said opening.

4. In a projector having a casing provided with an opening and a holder having oppositely disposed inturned edges for holding an object in projecting position adjacent the opening, the combination of a unitary sheet metal object plate, each of two opposite edge portions of said plate being formed with superimposed double reversed folds, one pair of similar folds forming outwardly facing slideways to slidably receive the inturned edges of said holder, the other pair of similar folds forming inwardly facing slideways to slidably receive an object to be projected, the end portions of the folds being angularly cut away toward the middle of the plate to provide an entrance throat for said objects when entering the slideways.

WRIGHT W. FROST.

REFERENCES CITED

The following references are of record in the file of this patent:

UNITED STATES PATENTS

| Number | Name | Date |
| --- | --- | --- |
| 1,127,504 | Patterson | Feb. 9, 1915 |
| 1,158,429 | Barton | Nov. 2, 1915 |
| 1,365,599 | Patterson | Jan. 11, 1921 |
| 1,831,766 | Hanks | Nov. 10, 1931 |
| 2,332,691 | Blaisdell | Oct. 26, 1943 |
| 2,200,637 | Perkins et al. | May 14, 1940 |